United States Patent [19]

Petrzelka et al.

[11] Patent Number: 5,118,214
[45] Date of Patent: Jun. 2, 1992

[54] CONNECTING ASSEMBLY

[75] Inventors: Miloslav Petrzelka, Much-Kranüchel; Werner Hoffman, Siegburg, both of Fed. Rep. of Germany

[73] Assignee: GKN Automotive AG, Siegburg, Fed. Rep. of Germany

[21] Appl. No.: 543,147

[22] Filed: Jun. 25, 1990

[30] Foreign Application Priority Data

Jun. 24, 1989 [DE] Fed. Rep. of Germany ....... 3920793

[51] Int. Cl.⁵ .......................... F16B 11/00; F16F 7/12
[52] U.S. Cl. .................... 403/267; 403/265; 403/359; 188/374; 188/376
[58] Field of Search ................... 403/1, 265, 267, 268, 403/359, 280–282, 365; 188/371, 374, 376

[56] References Cited

U.S. PATENT DOCUMENTS

| | | | |
|---|---|---|---|
| 3,143,321 | 8/1964 | McGehee et al. | 188/376 X |
| 3,339,674 | 9/1967 | Kroell et al. | 188/374 |
| 3,532,379 | 10/1970 | Reilly et al. | 188/374 X |
| 3,851,542 | 12/1974 | Adams et al. | 188/376 X |
| 4,102,030 | 7/1978 | King, Jr. | 403/281 X |
| 4,663,819 | 5/1987 | Traylor | 403/282 X |
| 4,722,717 | 2/1988 | Salzman et al. | 403/265 X |
| 4,892,433 | 1/1990 | Schreiber | 403/359 |

FOREIGN PATENT DOCUMENTS

| | | | |
|---|---|---|---|
| 62-17438 | 1/1987 | Japan | 188/376 |
| 2071812 | 9/1981 | United Kingdom . | |

Primary Examiner—Peter M. Cuomo
Attorney, Agent, or Firm—Toren, McGeady & Associates

[57] ABSTRACT

The invention relates to a connecting assembly for use in the propeller shaft in the driveline of a motor vehicle between the end of a tubular shaft, especially made of a composite material, and a connecting piece positioned coaxially relative to the shaft end. The shaft and connecting piece have connecting structures which inter-fit in the circumferential direction. The tubular shaft is designed to sustain without damage greater impacting force in the longitudinal axial direction than is required to displace the connecting piece relative to the shaft in this direction.

20 Claims, 6 Drawing Sheets

CONNECTING ASSEMBLY

BACKGROUND OF THE INVENTION

1. Field of the Invention

The invention relates to a connecting assembly suitable for use in a propeller shaft of the driveline of a motor vehicle. The assembly comprising a tubular shaft, preferably made of a composite material, and a connecting piece positioned coaxially relative to an end of the tubular shaft, the shaft and the connecting piece having connecting means which inter-fit with one another in the circumferential direction so that drive can be transmitted.

2. Description of Prior Art

From West German Patent Specification No. 30 07 896, there is known a connecting assembly of the said type in which the end of the tubular shaft is slid on to the connecting piece which is provided with outer teeth, with the teeth cutting into the tube surface. The outside of the connection is secured by an annular member safeguarding the assembly.

From West German Patent Specification No. 38 28 018, there is known a connecting assembly in which, again, a metallic connecting piece with outer teeth is pressed into the end of a fibre composite tubular shaft with the teeth cutting into the composite material and with the end of the shaft radially expanded. In the region adjacent the pressed-in connecting piece (which at the same time serves as a joint part) the cross-section of the fibre composite tube is reduced.

Furthermore, from US Patent Specification No. 4,722,717, there is known a connecting assembly between the open end of a fibre composite tubular shaft and a connecting piece in which complementary longitudinal and circumferential grooves are provided on the inner face of the shaft end and on the outer face of the inserted connecting piece, which grooves are filled with a hardenable resin which may contain short fibre parts so that after hardening of the resin a connecting member providing a form-fitting connection in the circumferential and axial directions is formed.

In the latter case, it is the intention to provide a connection between the end of the shaft and the connecting piece which may not only be torque-loaded but which is also axially firm. Because of their specific designs, the first two above-mentioned assemblies may also be subjected to high loads, or at least compressive forces, both in the circumferential and axial directions.

The deformation behaviour in the case of a frontal impact of a modern motor vehicle is specified from the point of view of design in such a way that certain progressive characteristic deformation curves are achieved.

When using the above-mentioned connecting assemblies in longitudinal driveshafts (propeller shafts) of motor vehicles with rear wheel drive or four wheel drive it has been found to be highly disadvantageous that fibre composite shafts or other lightweight shafts which, as a rule, may do without an intermediate joint because of their low weight, are characterised by a very high degree of stiffness. In the case of a frontal impact, the stiff propeller shaft and the mass inertia of the connected driving axle and differential causes the crush zone of the vehicle to be stiffened and to lose its protective effect for the passengers in the vehicle. The energy absorption conditions as specified are upset by the connection between the rear axle masses and the vehicle front through the propeller shaft and in consequence, the passenger bodies are braked too suddenly. In the case of an accident, this may lead to serious injuries or even death.

Furthermore, crash tests have demonstrated that even a safety device in the form of an air bag is adversely affected by the described effect of the stiff propeller shaft. In consequence, the air bags become effective at too late a stage, and again passengers do not receive the necessary protection.

SUMMARY OF THE INVENTION

It is the object of the present invention to provide a connecting assembly of the said type for use in motor vehicle propeller shafts in which the above-mentioned disadvantages in the case of a frontal impact are largely eliminated.

The invention provides a connecting assembly suitable for use in a propeller shaft of the driveline of a motor vehicle, the assembly comprising a tubular shaft and a connecting piece positioned coaxially relative to an end of the tubular shaft, the shaft and the connecting piece having connecting means which inter-fit with one another in the circumferential direction to enable drive transmission, wherein the tubular shaft is designed to sustain without damage greater impacting force in the longitudinal direction than is required to displace the connecting piece relative to the shaft in said direction.

In this way, it is possible to provide a simple design which ensures problem-free transmission of the necessary torque values, which, under standard operating conditions, is also capable of accommodating a limited amount of longitudinal forces in order, for example, to ensure the effect of conventional sliding joints following the shaft but which, in the case of frontal impacts or collisions, permits disconnection of the rear axle masses from the vehicle front by displacement of the connecting piece relative to the tubular shaft against the sticking forces which hold the connecting piece and tubular shaft together. Accordingly, the interfering influences affecting the crush zone and air bag initiation caused by the stiffness of the tubular shaft are eliminated.

Preferably, the sticking forces between the end of the tubular shaft and the connecting piece which are effective in the longitudinal direction are greater than the axial deceleration forces occurring in the tubular shaft in the axial direction as the result of a low-speed non-destructive frontal impact of the vehicle, such low speeds being in the area of "pedestrian protection" and "protection at low speeds", i.e. the so-called 3 mph impact of the vehicle should not lead to any changes in the connecting assembly.

The inter-fitting connecting means may be provided by an outer surface of the connecting piece which is polygonal in transverse cross-section or is provided with longitudinal teeth and by a complementary surface of a connecting member which is secured to an end portion of the tubular shaft. The connecting member may be a sleeve adhesively-secured to an end portion of the tubular shaft. The connecting member may be produced from a fibre composite material or suitable plastics or resin material which is adhesively-secured into the shaft end which is then slid on to the connecting piece. Alternatively, the connecting member may be formed in situ between the connecting piece and an end portion of the shaft between two collar regions. In this case, the connecting piece or tubular shaft are provided with supply and ventilation apertures to allow for introduction of a resin, especially a resin mixed with short fibres.

To avoid undue sticking forces between the toothed or polygonous connecting piece and the connecting member it may be sufficient to select and pair the right types of material, but as a rule separating means will have to be applied to the connecting piece. If this is not sufficient, the connection between the connecting piece and connecting member, prior to final assembly, may initially be torn off axially and then the two parts may be inserted into each other again while being adequately fixed for the purpose of receiving low forces.

The connecting member may advantageously be a sleeve having at least one opening therein so that at least in one circumferential region a direct adhesive-connection can be formed between the connecting piece and the tubular shaft.

According to a particularly advantageous embodiment, the shaft end, after separation of the connection by suitable means, is destroyed directly at the connecting assembly so that even during the subsequent process of vehicle deformation, the shaft stiffness will not have an adverse effect. For example, adjacent to the end of the tubular shaft, the connecting piece may be provided with a tearing cone for tearing the shaft.

It is also possible to provide a simple step arranged at an axial distance from the shaft end. It is important in this case that, for tearing off purposes, there are no substantial cross-sectional changes in the connecting piece immediately adjacent the shaft end.

For the purpose of ensuring an axially variable energy absorption, the tubular shaft may, in the axial direction, be provided with a variable wall thickness by means of which, in addition to the vehicle front, the characteristic deformation curve may be influenced. The force curves of the tubular shaft may be calculated to be opposite relative to those of the vehicle front, i.e. the force curves may decrease for increasing force curves in the vehicle front or vice versa. Suitable means of destruction are a tearing cone if the shaft end is slid on to the connecting piece or a squeezing cone if the shaft end is inserted into the connecting piece. It is even more advantageous to provide several circumferentially distributed cutting wedges which slit open the shaft in the longitudinal direction.

For the purpose of laterally controlling the destruction of the shaft end or for achieving certain force curves it may be advisable to design the tube end to be destroyed by a shaft step, a tearing or squeezing cone or cutting wedges with a thickness which varies along the shaft and length.

BRIEF DESCRIPTION OF THE DRAWINGS

Preferred embodiments of the present invention are illustrated in the drawings in which.

DESCRIPTION OF THE PREFERRED EMBODIMENTS

Figure 1:
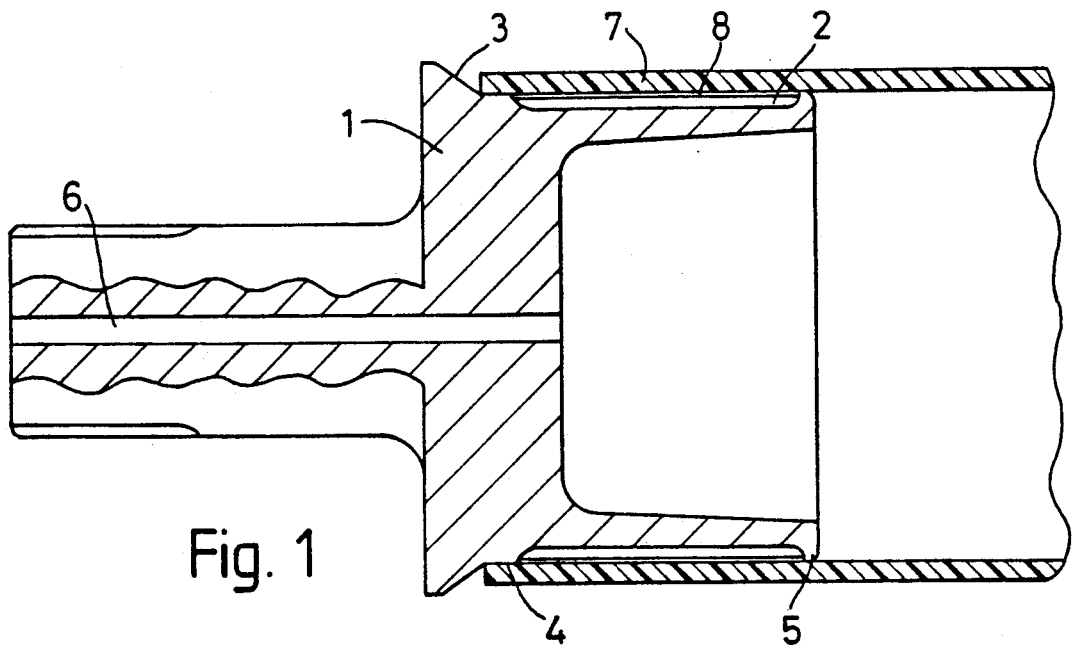
FIG. 1 is a longitudinal section through a connecting assembly having an expanding cone on the connecting piece.
Figure 1A:
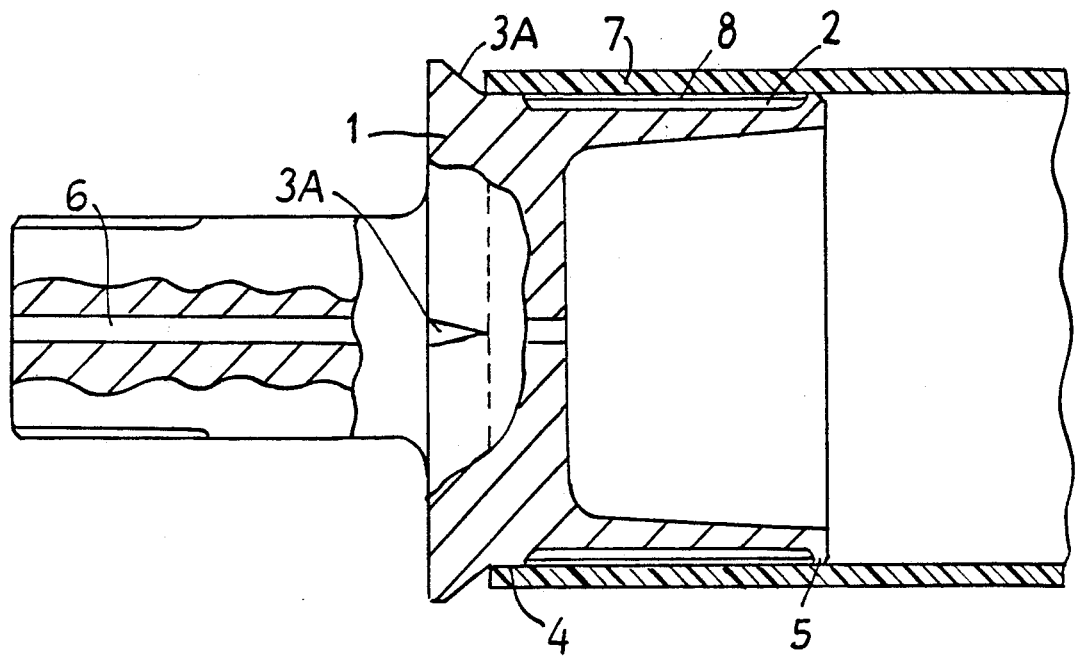
FIG. 1A is a view similar to FIG. 1, of an alternative embodiment.

FIG. 1 shows a connecting assembly suitable for use in a propeller shaft of the drive line of a motor vehicle. The assembly comprises a shaft 7 made of a fibre composite and a connecting piece 1 on to which the shaft 7 is slid. The connecting piece 1 is hence positioned coaxially relatively to an end of the shaft 7. The shaft 7 and the piece 1 have connecting means including a connecting member 8 which inter-fit with one another in the circumferential direction to allow drive transmission. The shaft end comprises two collar regions 4, 5 as centering means of the piece 1. Between these two collar regions, the connecting piece 1 comprises outer teeth 2. The connecting member 8 form-fittingly engages said teeth and has established an adhesion-fitting connection with the cylindrical inner face of the shaft end 7. In the region adjacent to the shaft end, the connecting piece 1 comprises an expanding cone 3 or several cutting wedges 3A, shown in FIG. 1A. The connecting piece 1 further comprises a central ventilation bore 6 extending coaxially therethrough.

Figure 2:
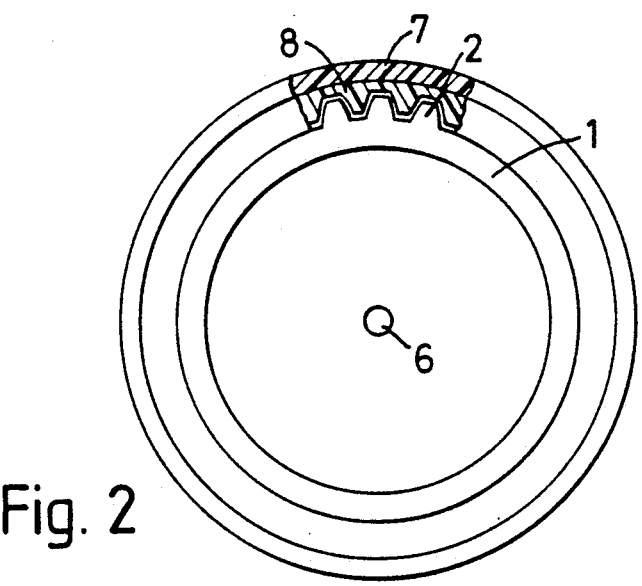
FIGS. 2 and 2A are respectively a cross-section through the connecting assembly according to FIG. 1 and an enlarged detail of FIG. 2.
Figure 2A:
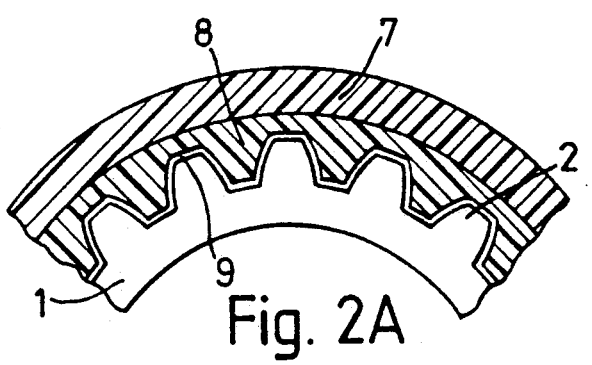
Figure 2B:
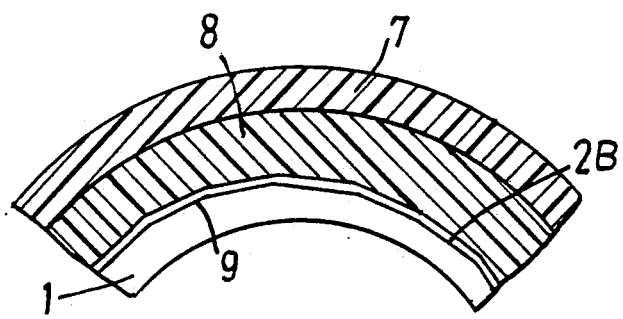
FIG. 2B is a view similar to FIG. 2A, of a different structure of the connecting piece.

FIG. 2 shows the connecting piece end provided with said teeth 2 and the internally cylindrical shaft end 7 between which there can be identified a connecting member 8 which is produced from hardened resin, especially fibre-reinforced resin, which has established an adhesion-fitting connection with the shaft and which is separated from the teeth 2 by separating means in a layer 9 in such a way that only a form-fitting connection is produced. FIG. 2B shows the connecting piece 1 having a polygonal outer surface 2.

Figure 3:
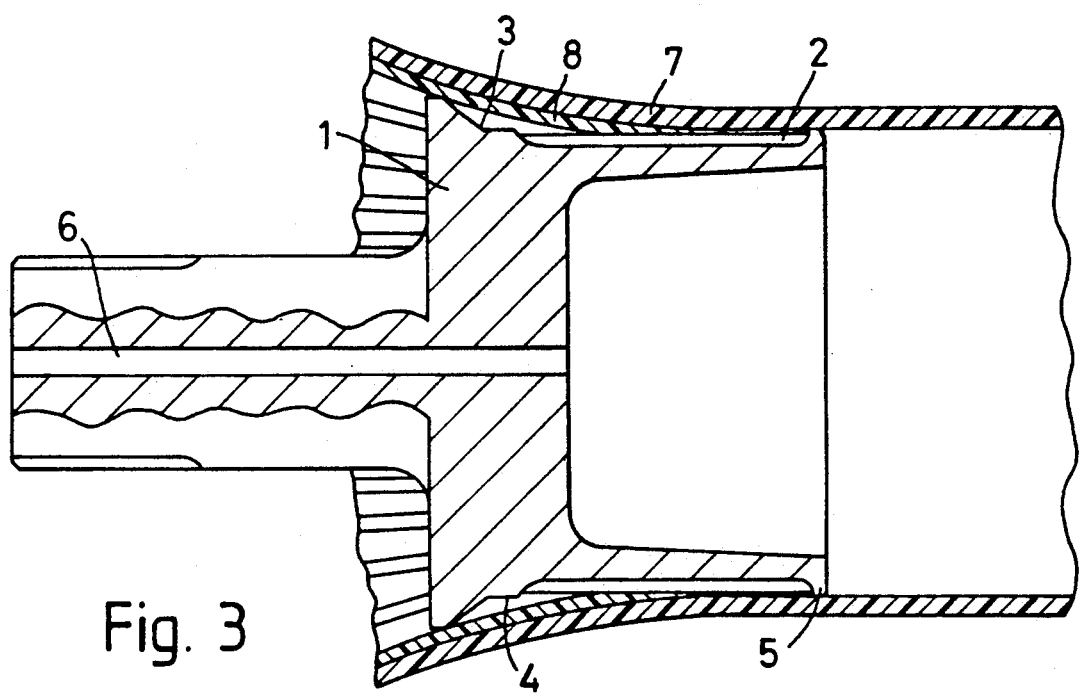
FIG. 3 shows the connecting assembly according to FIGS. 1 and 2 in a partially destroyed condition.

FIG. 3 shows the connecting assembly according to FIGS. 1 and 2 in the process of being destroyed. The shaft end 7 and the adhering connecting member 8 are permanently expanded by the expanding cone 3 and lifted off the teeth 2 between the collars 4, 5 without losing the closed tubular shape.

The tubular shaft 7 is designed to sustain without damage greater impacting force, e.g. as a result of a collision, in the longitudinal direction than is required to displace the connecting piece 1 relative to the shaft 7 in said direction.

Figure 4:
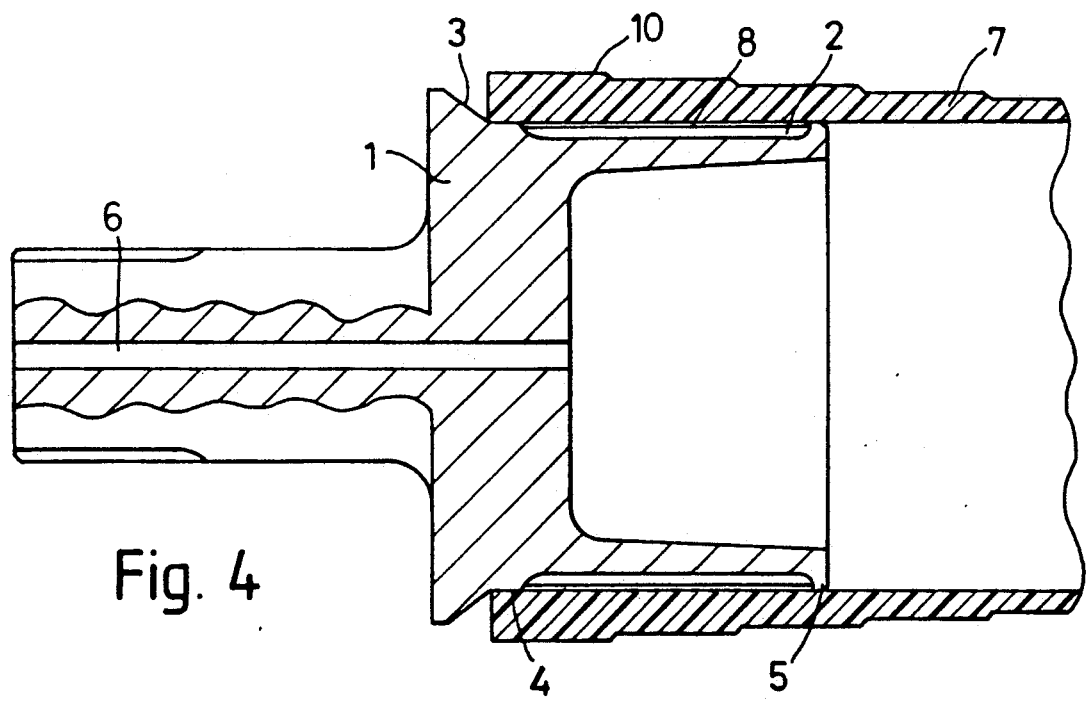
FIG. 4 shows a connecting assembly with an expanding cone at the connecting piece, and a shaft end with an increasing wall thickness.

FIG. 4 shows a connecting assembly which substantially corresponds to that shown in FIG. 1, but with the shaft end 7, towards its end, having thickened portions 10 for influencing the course of the destroying forces which in this case is degressive.

Figure 5:
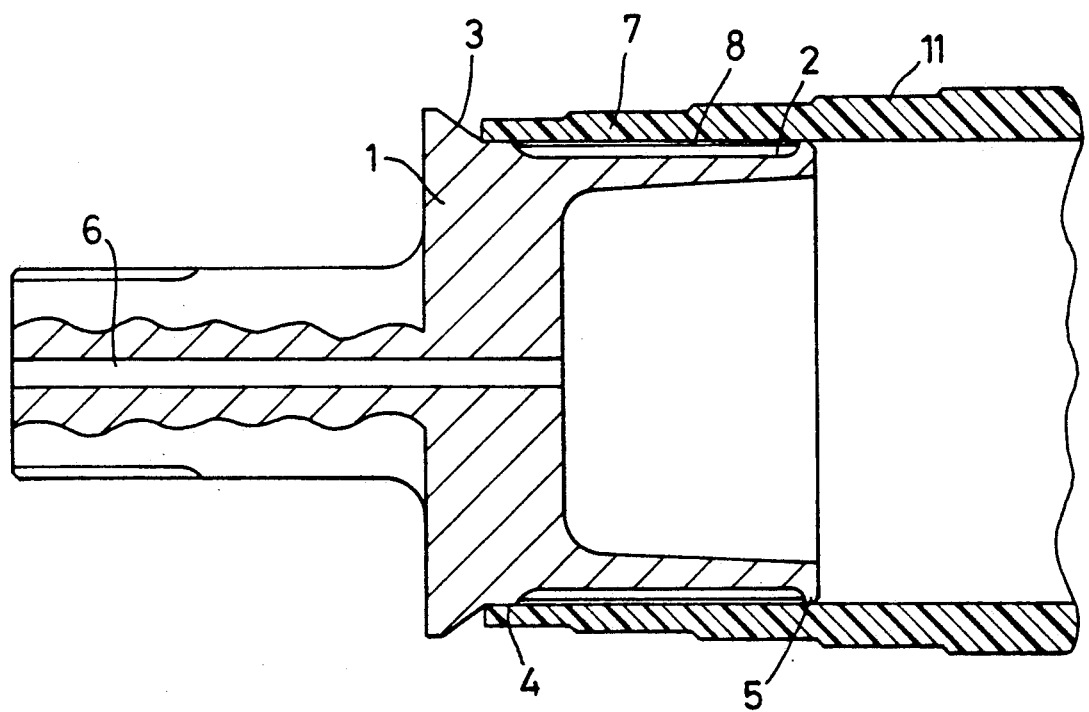
FIG. 5 shows a connecting assembly with an expanding cone at the connecting piece, and a shaft end with a decreasing wall thickness.

FIG. 5 shows a connecting assembly comprising the same details as those shown in FIG. 1, but with the shaft end 7 having portions 11 of reduced thickness for influencing the course of the destroying force which in this case is progressive.

Figure 6:
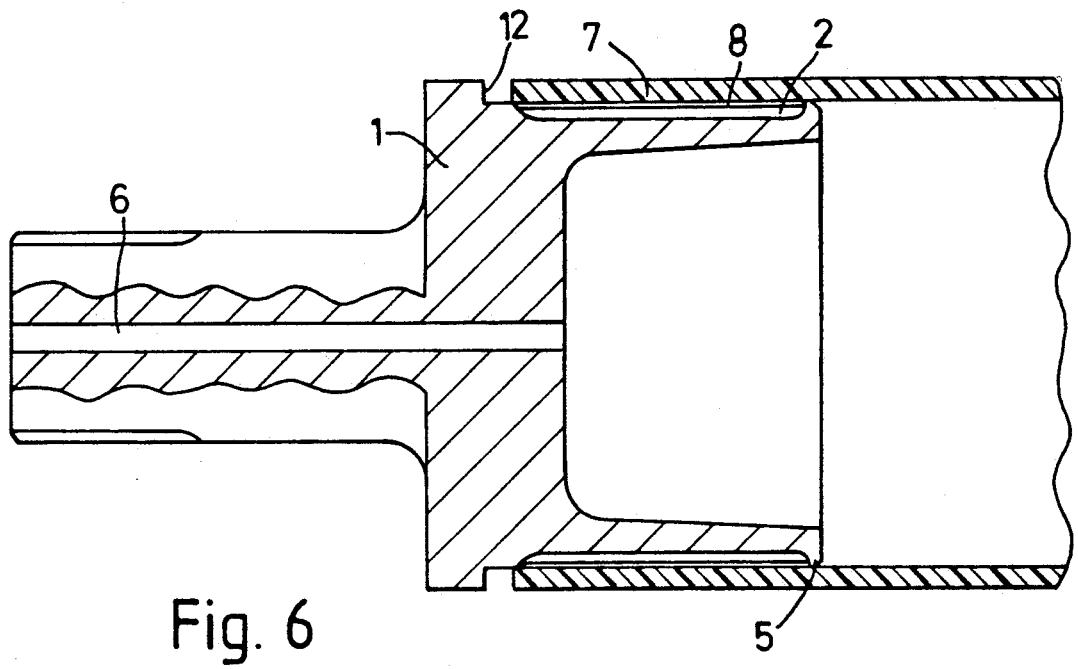
FIG. 6 shows a connecting assembly having an axial stop at the connecting piece at some distance from the shaft end.

FIG. 6 illustrates the shaft end of a fibre composite tubular shaft which is slid on to a connecting piece 1. The shaft end fits on to two collar regions 4, 5 of the connecting piece between which the connecting piece comprises outer teeth. A connecting member 8 form-fittingly engages said teeth and establishes an adhesion-fitting connection with the cylindrical inner surface of the shaft end 7. At a distance from the shaft end 7, the connecting piece 1 comprises an axial step 12 which, after the initially slight release of the shaft end from the connecting piece, causes its destruction upon impact. The connecting piece 1 further comprises a central ventilation bore 6.

Figure 7:
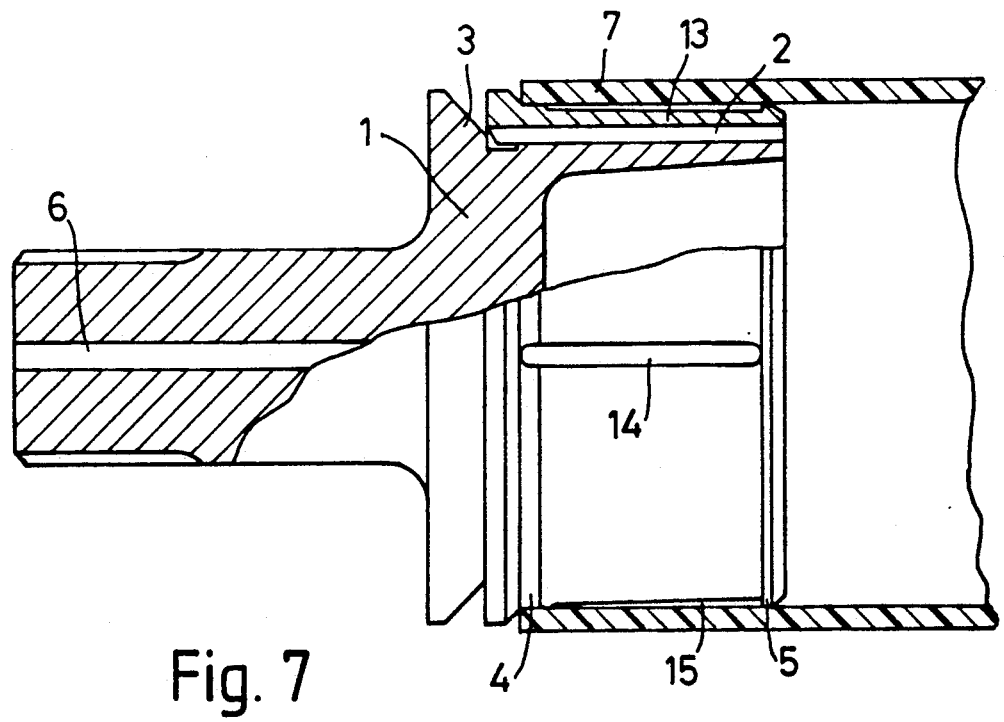
FIG. 7 shows a connecting assembly having an expanding cone at the connecting piece and a separate, slotted intermediate member.

FIG. 7 shows a connecting assembly comprising the shaft end 7 of a fibre composite tubular shaft and a connecting piece 1 provided with an expanding cone 3 and a ventilation bore 6 and comprising outer teeth 2. In the shaft end 7 there has been provided a connecting member 13 in the form of a separate sleeve which is tubular shaft 7 by gluing, and which has inner teeth which engage the outer teeth 2 of the connecting piece 1. The sleeve 13 comprises an axial slot 14 which permits a partial adhesion-fitting connection between the connecting piece 1 and the tubular shaft 7 and at the same time facilitates the opening-up process by the expanding cone in the course of the destruction of the shaft end. It is also possible to do without this effect and for example provide simple round radial apertures. An annular space 15 between the sleeve 13 and the shaft end 7 provides space for a volume of glue establishing an adhesion-fitting connection with both parts.

Figure 8:
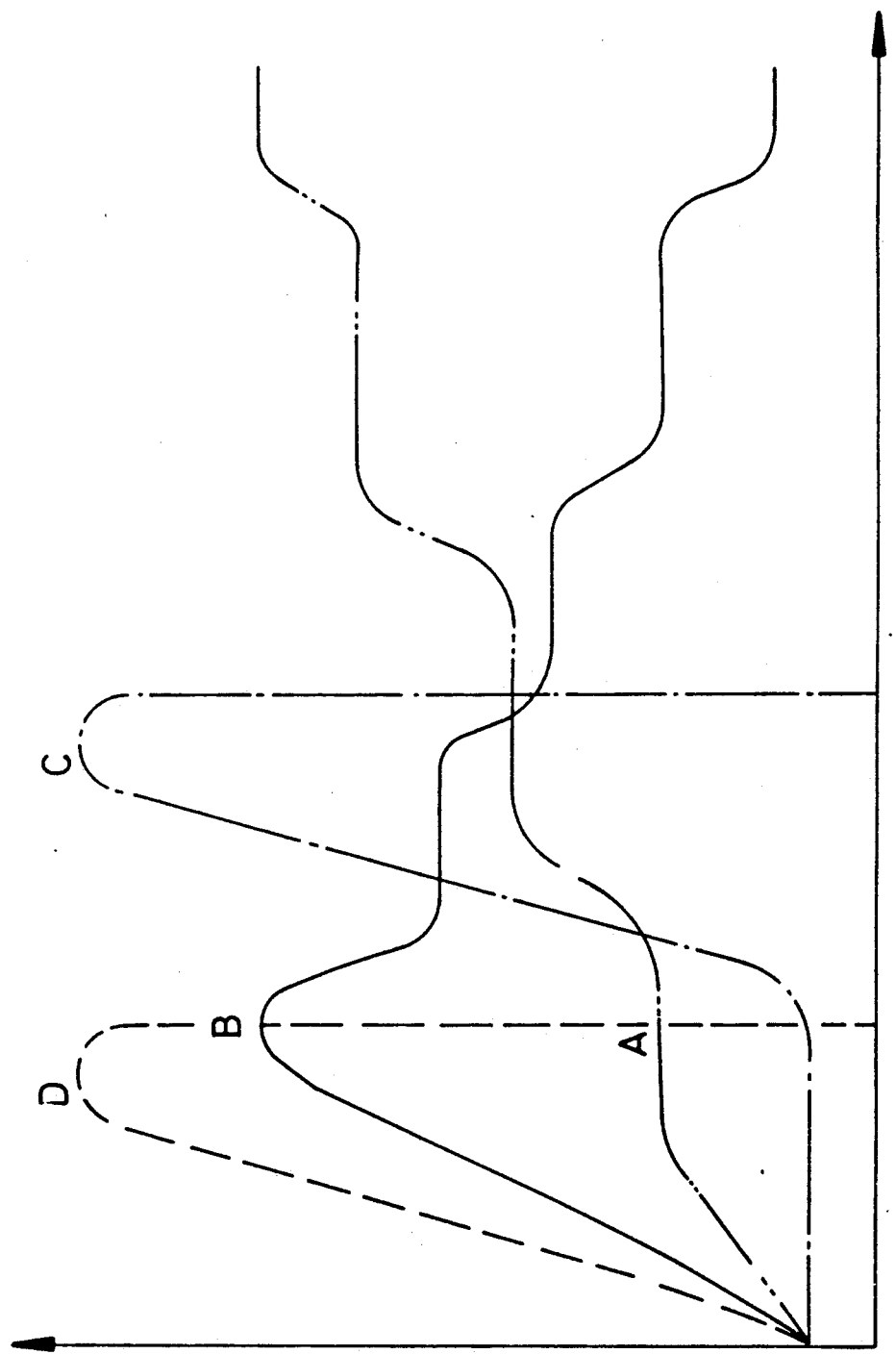
FIG. 8 shows force-time curves of differently designed connecting pieces.

FIG. 8 illustrates several force-time diagrams of different connecting assemblies designed in accordance with the principle of the invention and compared with a tube end in accordance with the state of the art. Curve "A" represents the course of destruction of the shaft end according to FIG. 4, curve "B" represents the course of destruction of the shaft end according to FIG. 5, curve "C" represents the course of destruction of the shaft end of a connecting assembly according to FIG. 6, whereas curve "D" represents the destruction of a shaft end in accordance with the state of the art, for example according to U.S. 4,722,717.

We claim:

1. A connecting assembly suitable for use in a propeller shaft of the driveline of a motor vehicle, the assembly comprising:
    a tubular shaft and a connecting piece slid into and positioned coaxially relative to an end of the tubular shaft; and
    connecting means which inter-fit with one another in the circumferential direction to enable drive transmission, wherein the tubular shaft is constructed to sustain without damage greater impacting force in the longitudinal direction than is required to displace the connecting piece relative to the shaft in the longitudinal direction against sliding forces, the inter-fitting connecting means being provided by an outer surface of the connecting piece which has a generally polygonal cross-section and by a complementary surface of a connecting member which is secured to an end portion of the tubular shaft, and the connecting member being a sleeve adhesively-secured to an end portion of the tubular shaft, the connecting member being provided between the connecting piece and an end portion of the tubular shaft between two collar regions of the connecting piece.

2. An assembly according to claim 1, wherein the connecting member has at least one opening therein so that at least in one circumferential region a direct adhesive-connection can be formed between the connecting piece and the tubular shaft.

3. An assembly according to claim 1, wherein adjacent to an end of the tubular shaft, the connecting piece is provided with tearing cone.

4. An assembly according to claim 1, wherein the connecting piece has a coaxial ventilation bore therethrough.

5. An assembly according to claim 1, wherein adjacent the end of the tubular shaft, the connecting piece is provided with at least one cutting wedge.

6. An assembly according to claim 1, wherein at an axial distance from the tubular shaft, the connecting piece is provided with a step in cross-section covering at least part of the cross-section of the tubular shaft.

7. An assembly according to claim 1, wherein, for the purpose of ensuring axially variable energy absorption, the tubular shaft, in the longitudinal direction, is provided with a variable wall thickness.

8. An assembly according to claim 1, wherein the tubular shaft is made of a composite material.

9. An assembly according to claim 1, wherein the outer surface of the connecting piece is provided with longitudinal teeth.

10. A connecting assembly suitable for use in a propeller shaft of the driveline of a motor vehicle, the assembly comprising:
    a tubular shaft and a connecting piece slid into and positioned coaxially relative to an end of the tubular shaft; and
    connecting means which inter-fit with one another in the circumferential direction to enable drive transmission, wherein the tubular shaft is constructed to sustain without damage greater impacting force in the longitudinal direction than is required to displace the connecting piece relative to the shaft in the longitudinal direction against sliding forces, the inter-fitting connecting means being provided by an outer surface of the connecting piece which has a generally polygonal cross-section and by a complementary surface of a connecting member which is secured to an end portion of the tubular shaft, and the connecting member being a sleeve adhesively-secured to an end portion of the tubular shaft, separating means being provided between the connecting piece and the complementary surface of the connecting member.

11. An assembly according to claim 10, wherein the connecting member has at least one opening therein so that at least in one circumferential region a direct adhesive-connection can be formed between the connecting piece and the tubular shaft.

12. An assembly according to claim 10, wherein adjacent to the end of the tubular shaft, the connecting piece is provided with a tearing cone.

13. An assembly according to claim 10, wherein the connecting piece has a coaxial ventilation bore therethrough.

14. An assembly according to claim 10, wherein adjacent the end of the tubular shaft, the connecting piece is provided with at least one cutting wedge.

15. An assembly according to claim 10, wherein, at an axial distance from the tubular shaft, the connecting piece is provided with a step in cross-section covering at least part of the cross-section of the tubular shaft.

16. An assembly according to claim 10, wherein, for the purpose of ensuring axially variable energy absorption, the tubular shaft, in the longitudinal direction, is provided with a variable wall thickness.

17. An assembly according to claim 10, wherein the tubular shaft is made of a composite material.

18. An assembly according to claim 10, wherein the outer surface of the connecting piece is provided with longitudinal teeth.

19. A connecting assembly suitable for use in a propeller shaft of the driveline of a motor vehicle, the assembly comprising:

a tubular shaft and a connecting piece slid into and positioned coaxially relative to an end of the tubular shaft; and connecting means which inter-fit with one another in the circumferential direction to enable drive transmission, wherein the tubular shaft is constructed to sustain without damage greater impacting force in the longitudinal direction than is required to displace the connecting piece relative to the shaft in the longitudinal direction against sliding forces, the inter-fitting connecting means being provided by an outer surface of the connecting piece which has a generally polygonal cross-section and by a complementary surface of a connecting member which is secured to an end portion of the tubular shaft, and the connecting member being a sleeve adhesively-secured to and end portion of the tubular shaft, the connecting piece being provided with a tearing cone adjacent to the end of the tubular shaft.

20. A connecting assembly suitable for use in a propeller shaft of the driveline of a motor vehicle, the assembly comprising:

a tubular shaft and a connecting piece slid into and positioned coaxially relative to an end of the tubular shaft; and connecting means which inter-fit with one another in the circumferential direction to enable drive transmission, wherein the tubular shaft is constructed to sustain without damage greater impacting force in the longitudinal direction than is required to displace the connecting piece relative to the shaft in the longitudinal direction against sliding forces, the inter-fitting connecting means being provided by an outer surface of the connecting piece which has a generally polygonal cross-section and by a complementary surface of a connecting member which is secured to an end portion of the tubular shaft, and the connecting member being a sleeve adhesively-secured to and end portion of the tubular shaft, the connecting piece being provided with at least one cutting wedge adjacent the end of the tubular shaft.

* * * * *